Aug. 21, 1923.
J. W. PAGE
1,465,678
CONTROL MECHANISM
Filed Jan. 26, 1922
6 Sheets-Sheet 1
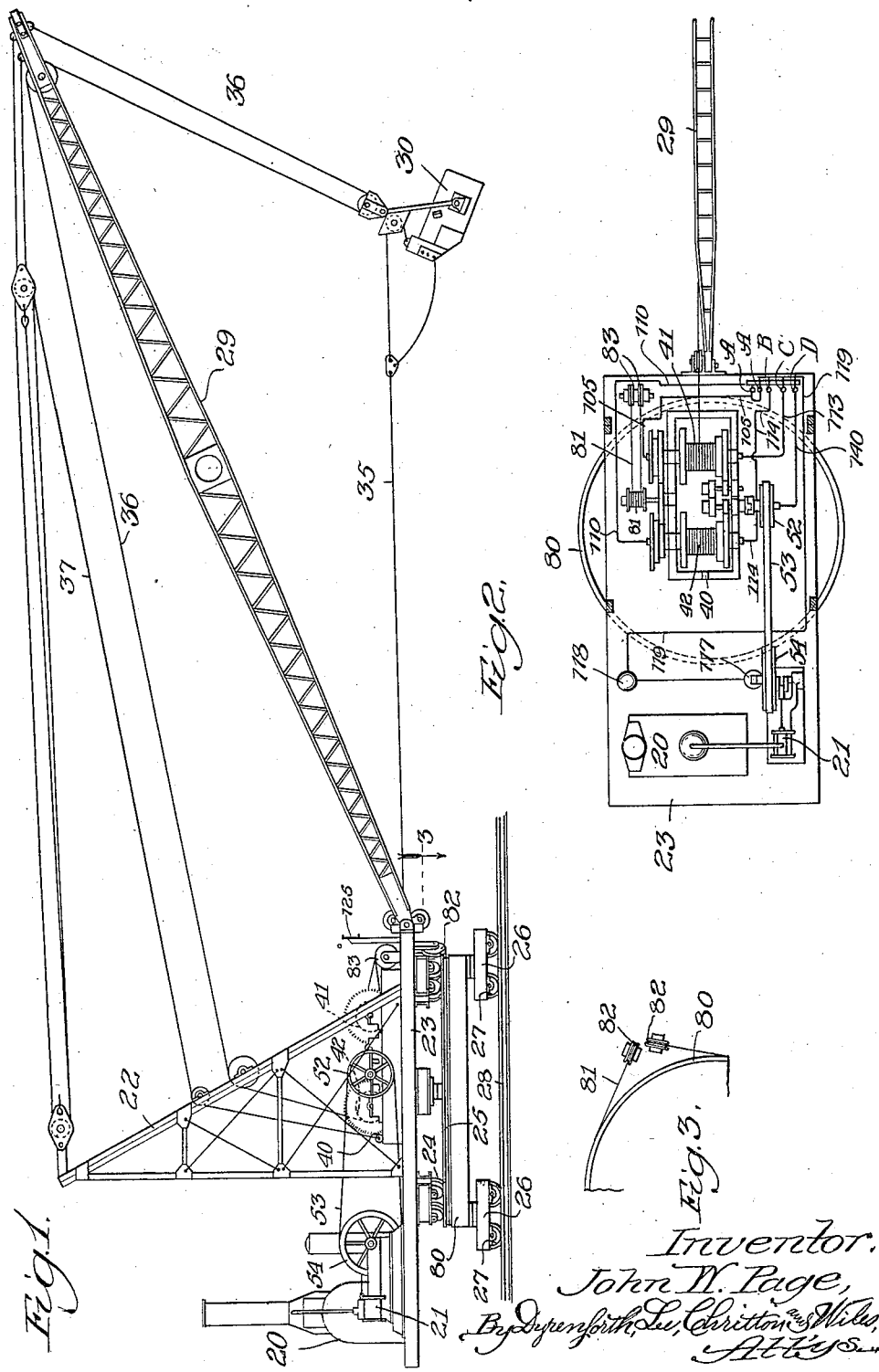
Inventor:
John W. Page,
By Dyrenforth, Lee, Chritton and Wiles,
Att'ys

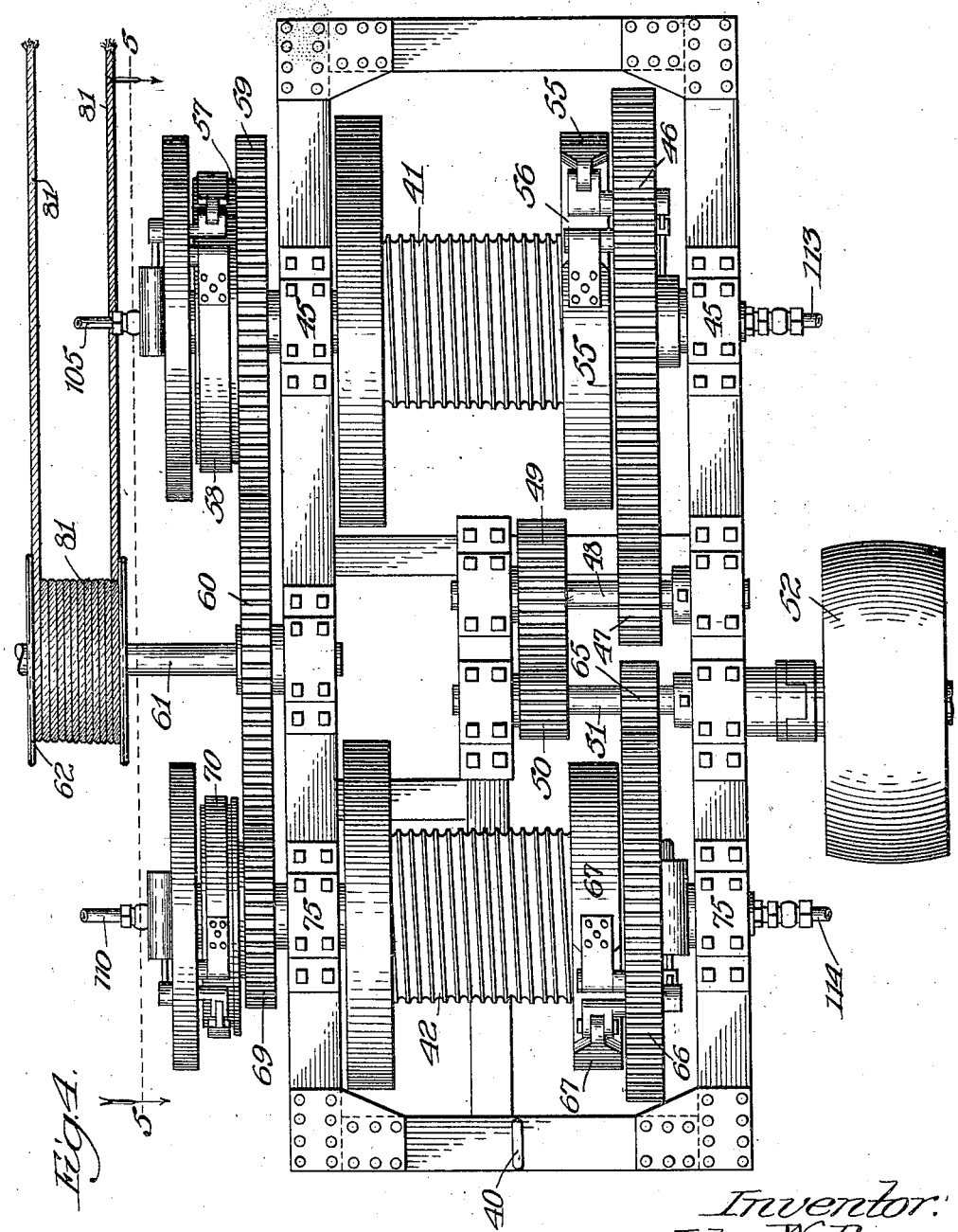

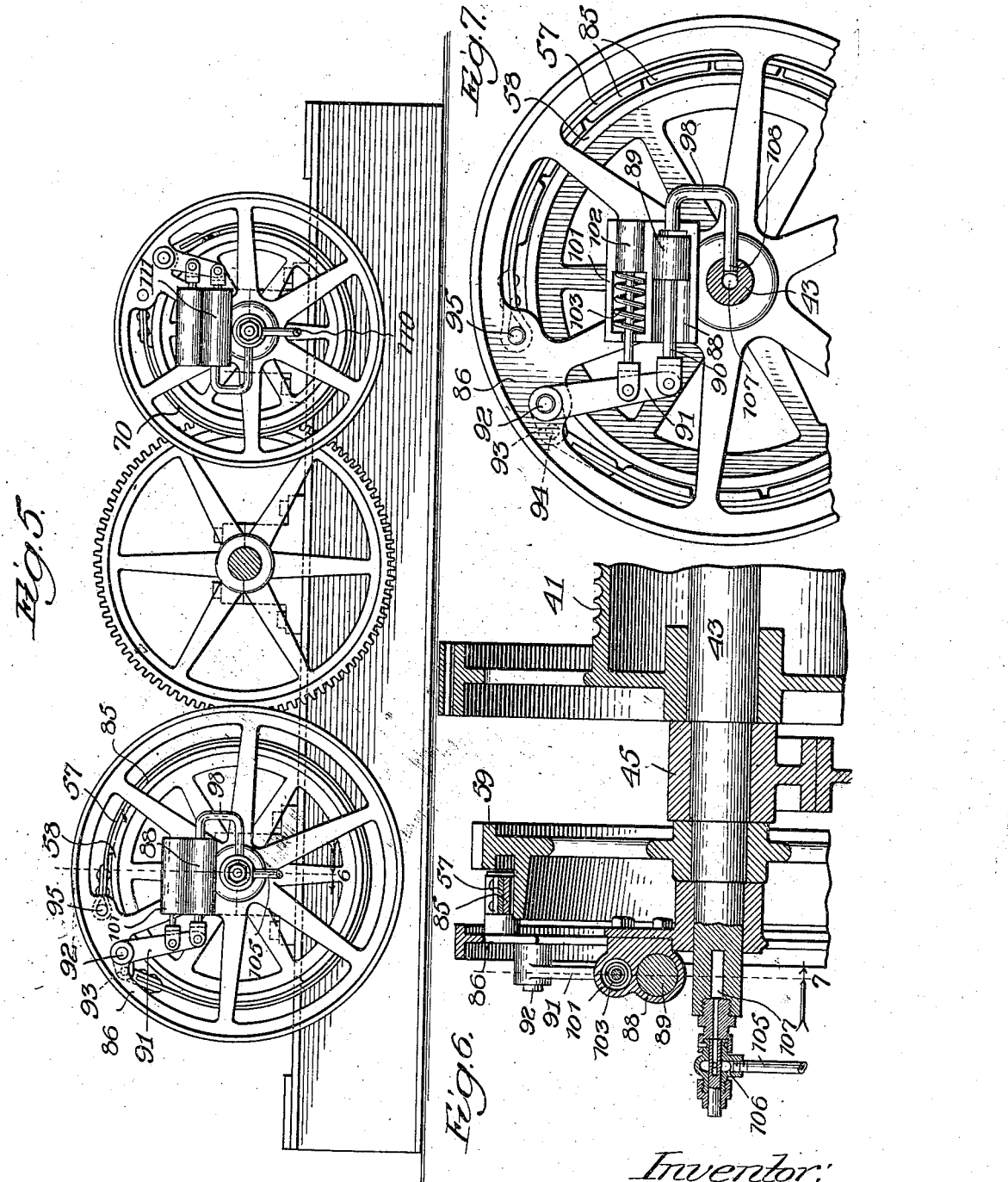

Aug. 21, 1923.
J. W. PAGE
CONTROL MECHANISM
Filed Jan. 26, 1922
1,465,678
6 Sheets-Sheet 4
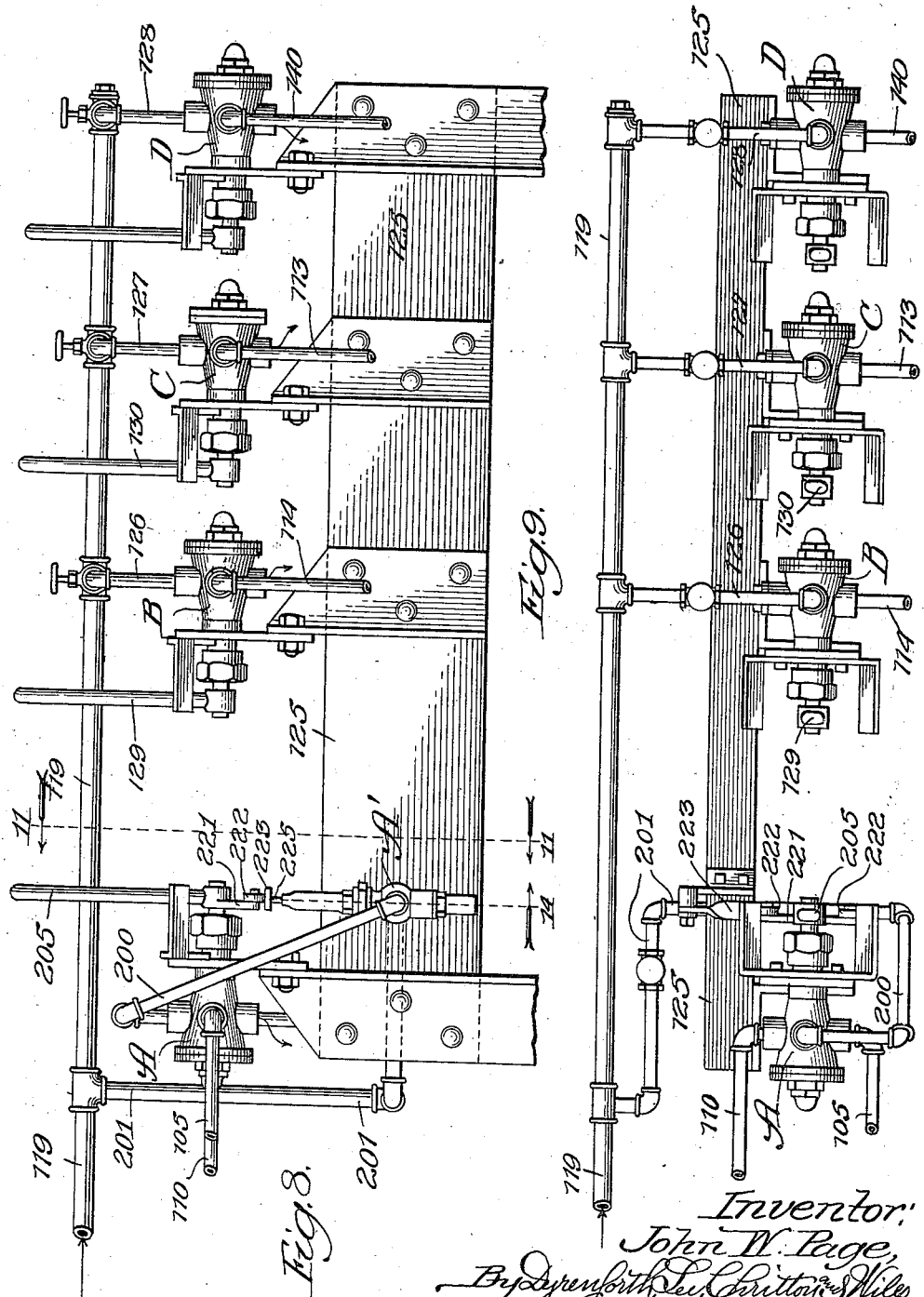
Inventor:
John W. Page,
By Dyrenforth, Lee, Chritton & Wiles
Att'ys Aug. 21, 1923.
J. W. PAGE
1,465,678
CONTROL MECHANISM
Filed Jan. 26, 1922
6 Sheets-Sheet 5
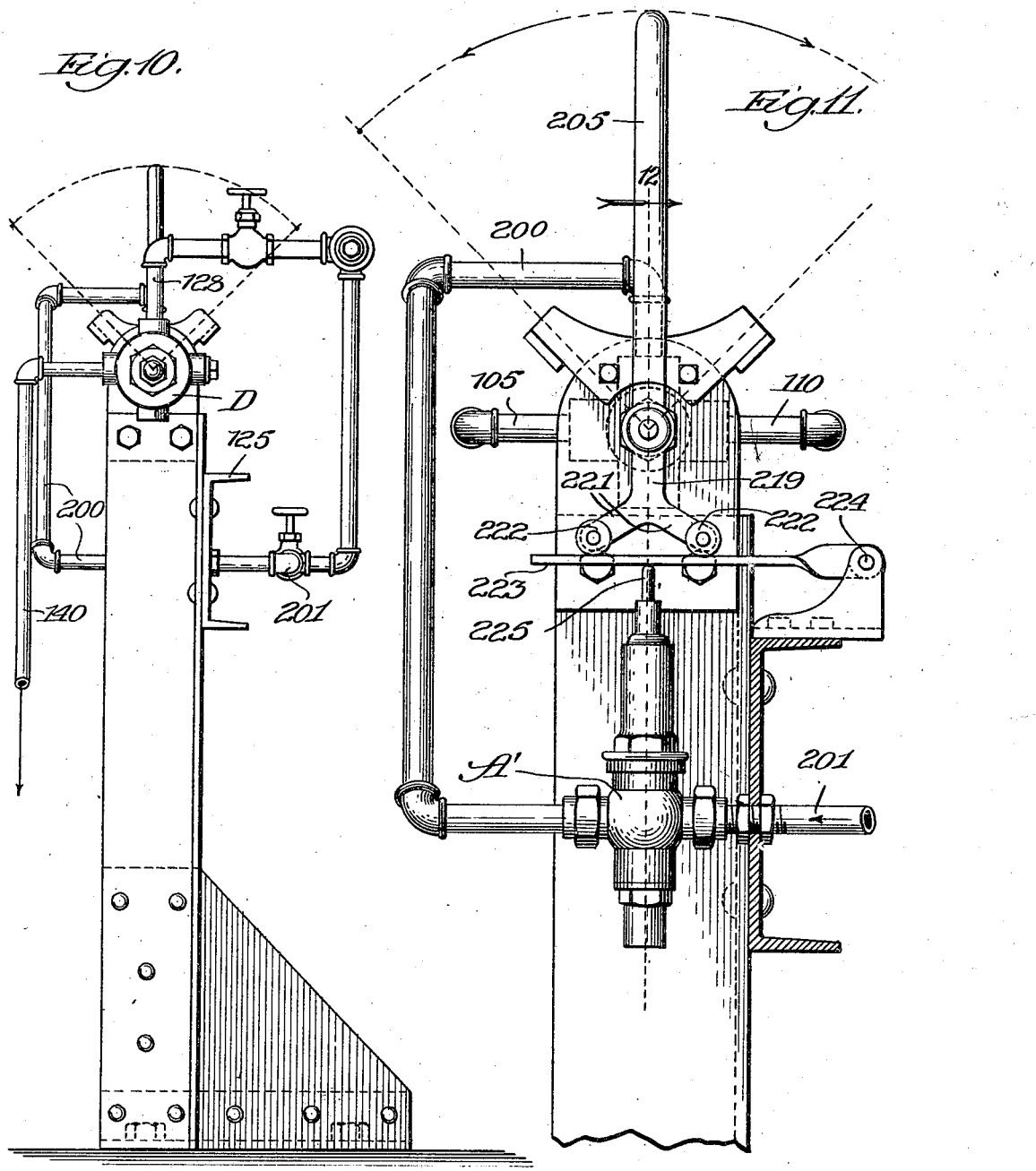

Aug. 21, 1923.
J. W. PAGE
CONTROL MECHANISM
Filed Jan. 26, 1922
1,465,678
6 Sheets-Sheet 6
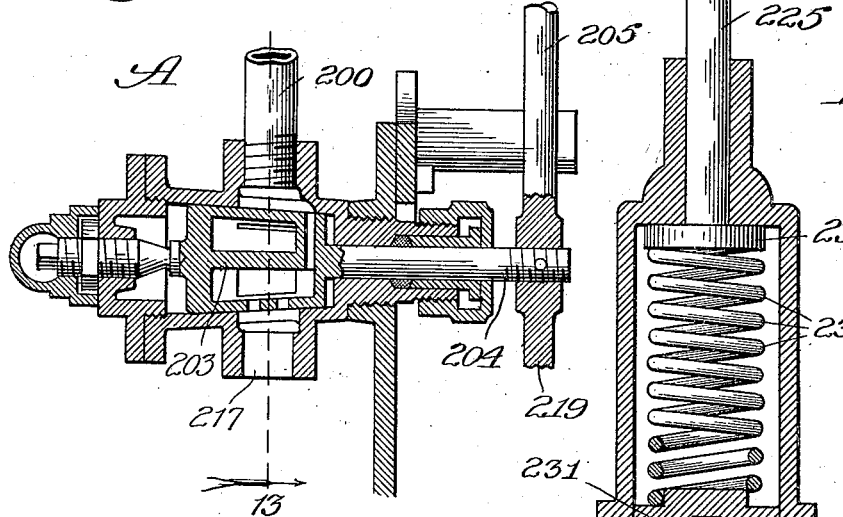
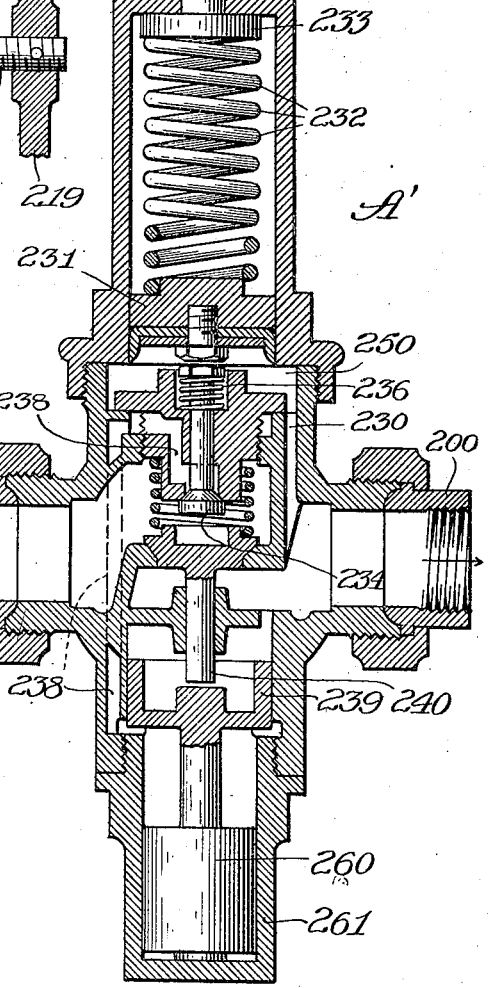
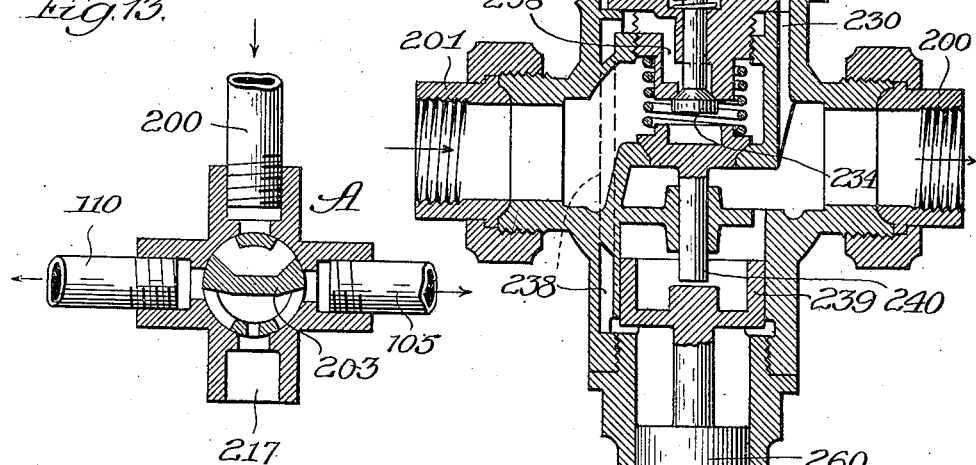

Patented Aug. 21, 1923.

1,465,678

UNITED STATES PATENT OFFICE.

JOHN W. PAGE, OF CHICAGO, ILLINOIS.

CONTROL MECHANISM.

Application filed January 26, 1922. Serial No. 531,913.

*To all whom it may concern:*

Be it known that I, JOHN W. PAGE, a citizen of the United States, residing at 189 West Madison Street, Chicago, in the county of Cook and State of Illinois, have invented a new and useful Improvement in Control Mechanism, of which the following is a specification.

By the use of my invention, it is possible to deliver fluid at any desired pressure (within a given range) to an engine, cylinder, clutch, or other device, and maintain said pressure constant, regardless of the rate of consumption of such fluid by the device, and regardless of the initial pressure of the fluid. In the case, for example, of an ordinary throttle valve controlling the inlet to a piston, it is absolutely impossible to obtain, for example, a ten-pound pressure in the cylinder and maintain this pressure in the cylinder at this point; assuming the boiler pressure to be considerably more than ten pounds. If such ordinary throttle is opened wide, the pressure will far exceed ten pounds; and if it is opened very slightly, the fluid will begin to enter the cylinder slowly and the pressure will be built up slowly until the pressure in the cylinder is practically the same as the boiler pressure. In other words, with such an ordinary throttle it is impossible to hold the cylinder pressure down to a given figure. With my improved control mechanism, on the other hand, it is possible to give, for example, a ten-pound pressure very quickly to a cylinder and also hold the pressure at exactly this point in the cylinder, regardless of the rate of consumption of the fluid in the cylinder. Also, with my improved device, it is possible to vary the pressure given to the cylinder, at will. Other features and advantages of my invention will appear more fully as I proceed with my specification.

In the accompanying drawings, I have shown my invention as used in connection with the operation and control of an excavator. In such an excavator friction clutches are frequently employed. Such clutches are ordinarily operated by compressed air and it is usually necessary to maintain a constant and predetermined tension on one or more of them in order to give the proper control. With my improved control mechanism it is possible to do this; and consequently avoid jerking and grabbing. With my improved mechanism it is also possible to make this tension as strong or weak as desired, within the range of the power available. Although I have shown, for the purpose of illustration, my invention as embodied in a control mechanism used in connection with an excavator; it is obvious that, without detracting from the spirit of my invention, it could be used in connection with other devices where similar requirements are desired.

In that form of device embodying the features of my invention as shown in the accompanying drawings, Figure 1 is a view in side elevation of an excavator equipped with my improved control mechanism, Fig. 2 is a top plan view of the same, Fig. 3 is a view taken as indicated by the line 3 of Fig. 1, Fig. 4 is a top plan view on an enlarged scale showing the winding drums, Fig. 5 is a view taken as indicated by the line 5 of Fig. 4, Fig. 6 is a view taken as indicated by the line 6 of Fig. 5, Fig. 7 is a view taken as indicated by the line 7 of Fig. 6, Fig. 8 is a view on an enlarged scale in front elevation of the valves forming a part of the control mechanism, Fig. 9 is a top plan view of the same, Fig. 10 is a view of the same in side elevation, Fig. 11 is a view taken as indicated by the line 11 of Fig. 8, Fig. 12 is a view taken as indicated by the line 12 of Fig. 11, Fig. 13 is a view taken as indicated by the line 13 of Fig. 12, and Fig. 14 is a view taken as indicated by the line 14 of Fig. 8.

As shown in the drawings, there is illustrated in Figs. 1 and 2, an excavator comprising, in general, a boiler 20, engine 21, and tower 22, mounted together with winding drums and other parts on a rotatable platform 23. The platform 23 is supported by flanged wheels 24 on a circular track 25 in the usual manner. The entire excavator, in turn, is mounted on trucks 26 equipped with flanged wheels 27 travelling on tracks 28. Attached to the platform 23 is the usual boom 29, having suspended from its end an excavating bucket 30. A hauling rope or cable 35 is attached to the bucket 30 for the purpose of hauling the bucket during the scooping or cutting operation. Likewise a rope or cable 36 is provided for the purpose of lifting the bucket to dump the same. A rope or cable 37 is provided in the usual manner for raising or lowering the boom 29. The ropes 35 and 36 are controlled by winding drums, which will be described more in particular hereinafter. The rope 37 is shown, for convenience, as attached at 40; although in actual practice it is usually fastened to a winding drum or some other means, in order to adjust the boom 29. In the apparatus as shown, it could be operated by one of the winding drums, which will be described more in particular hereinafter.

The winding drums mentioned above comprise a drum 41, about which is wound the rope 35. Parallel to this drum is another drum 42, holding the rope 36. The drum 41 is rotatably mounted upon a shaft 43, which is suitably supported in bearings 45. The shaft 43 is driven by means of a pinion 46, operated by a pinion 47, mounted on a shaft 48, which in turn is driven by a pinion 49, operated in turn by a pinion 50 on the shaft 51. The shaft 51 is driven by a belt-wheel 52 which is operated by a belt 53, driven by a wheel 54 of the engine 21. The pinion 46 carries a clutch band 55 adapted to be tightened on the drum 56, which is fastened to the drum 41. It is obvious that when the shaft 43 is rotating, tightening of the band 55 on the drum 56 will serve to rotate the drum 41. In like manner, there is mounted on the other end of the shaft 43 a clutch band 57 adapted to be tightened onto the drum 58, which is attached to a pinion 59 for the purpose of driving such pinion, to drive in turn a pinion 60 mounted on a shaft 61 carrying a drum 62. The drum 42 is mounted, in a similar manner to the drum 41, on a shaft, which is driven by means of a pinion 65 on the shaft 51, which meshes with a pinion 66 carrying a clutch band 67 similar to the clutch band 55, for the purpose of operating the drum 42. The shaft carrying the drum 42 is provided with a pinion 69 similar to the pinion 59, which meshes with the pinion 60. The pinion 69 is adapted to be operated by means of a clutch band 70 in the same manner that the clutch band 57 operates the pinion 59. It will be noted that the two shafts carrying the drums 41 and 42 rotate in opposite directions; consequently the shaft 71 carrying the drum 62 may be operated in either direction desired, by using the proper pinion 59 or 69 to operate the pinion 60. The shaft carrying the drum 42 is mounted in suitable bearings 75, corresponding to the bearings 45.

The following means are provided for rotating the platform 23 on the rails 25. Wound about the circular platform 80, on which the circular track 25 is mounted, is an endless rope or cable 81, which is led tangentially away from the platform 80 to two pulleys 82 mounted on the underside of the platform 23 (see Fig. 3) thence upwardly over the pulleys 82 over two pulleys 83 mounted on the rotating platform 23, and thence around the drum 62. It will be seen that by this construction, rotation of the drum 62 in one direction, will wind in one end of the rope 81 and pay out the other, thus causing rotation of the platform 23 in one direction. Likewise rotation of the drum 62 in the opposite direction, will cause reverse rotation of the platform 23.

It will be seen, therefore, that rotation of the platform 23 is controlled by rotation of the drum 62, which in turn is controlled by the two clutch bands 57 and 70; one being used for each direction of rotation. Likewise the rope 35, for hauling the bucket 30, is controlled by the drum 41, which in turn is controlled by the clutch band 55. Likewise the clutch band 67 controls the drum 42, which in turn controls the rope 36, used for lifting the bucket 30.

Since all the clutch bands 57, 70, 55 and 67 are constructed in a similar manner, I will describe in detail but one. In Fig. 7 there is illustrated clutch band 57. It will be noted that the inner side of this band is provided with a series of friction shoes 85, adapted to contact with the drum 58, when the band 57 is contracted. The following mechanism is provided for contracting the band 57. Mounted on the wheel 86, which carries the clutch band 57, is a cylinder 88 having mounted therein a piston 89. A piston rod 90 connects the piston 89 with the long arm 91 of a bell-crank lever pivoted at 92. The short arm 93 of this bell-crank lever is pivotally connected at 94 to one end of the band 57. The other end of the band 57 is mounted to the wheel 86 at 95. Outward movement (to the left as viewed in Fig. 7) of the piston 89 moves the arm 91, causing the bell-crank lever to pivot at 92, thus causing the arm 93 to rock to tighten the band 57 on the drum 58. The piston 89 is moved by means of compressed air introduced through the pipe 98 into the end of the cylinder 88 behind the piston 89. Arranged parallel to the cylinder 88 and above it, is a smaller cylinder 101 provided with a plunger 102 adapted to work against the spiral spring 103 within the cylinder 101, in order to offer a springing resistance to the contraction of the band 57. Compressed air is supplied to the pipe 98, through a pipe 105, provided with a swivel connection 106, mounted on the end of the shaft 43, to permit rotation of the shaft 43, while the pipe 105 remains stationary. Compressed air is conducted from the pipe 105 through the swivel coupling into a hole 107 bored into the end of the shaft 43. From this hole 107 it is conducted through a radial hole 108, and thence into the pipe 98 leading to the cylinder 88. In like manner, compressed air is fed from the pipe 110 to the cylinder 111, having mounted within it a piston controlling the clutch band 70. Likewise compressed air is fed through the pipe 113 to similar mechanism controlling the clutch band 55, and through the pipe 114 to the mechanism controlling the band 67.

Compressed air for operating the bands 57, 70, 55 and 67 may be obtained in any desired manner I have here shown an air compressor 117, operated by the engine 21 supplying compressed air to the supply tank 118.

The compressed air is conducted from the tank 118 by means of the pipe 119 to the valves of the controlling mechanism (see Figs. 8 to 14). These valves are mounted in any suitable manner, for example, on a support 125, and comprise the valves A, B, C and D, respectively. The pipes 126, 127 and 128 connect the valves B, C and D, respectively, with the supply pipe 119. The valve B is controlled by a lever 129, in order to admit air into the pipe 114, and likewise the valve C, operated by the handle 130, controls admission of air into the pipe 113. The valve D likewise controls admission of air into the pipe 140, which may lead to any desired clutch mechanism.

Valve A controls the air which enters the pipes 105 and 110, which control the clutch bands 57 and 70, respectively. These clutch bands control the drum 62. In order to give the proper control of this drum, which rotates the platform, it is necessary or desirable that means be provided for putting any predetermined tension on either one of these clutch bands and maintain such tension constant. I have provided means for accomplishing this. With my improved control mechanism, it is possible to quickly put any desired tension on either of these clutch bands (within the range of the power available) and maintain such tension constant as long as desired. It is also possible, to change such tension as desired, and hold any chosen tension constant This is accomplished by providing means operating in connection with the valve A, by which any desired pressure of air (within the range of the pressure available) may be admitted into either the pipe 105 or 110; and such pressure maintained constant in such pipe. When the desired pressure is put into either of these pipes, it remains constant, and there is no building up of pressure. The desired pressure also remains constant regardless of the leakage or consumption in the cylinders 88 or 111. Also, with my improved construction, the pressure, which it is desired to maintain in either of these pipes, may be changed at will. I will now describe in detail the means by which this is accomplished. The valve A is a four-way valve (see Figures 11, 12 and 13). air entering at the top through the pipe 200, which leads to a reducing valve A', the valve A' being supplied with air from the pipe 201, which connects with the pipe 119, as shown. The four-way valve A is adapted to admit air from the pipe 200 into either the pipe 105 or 110 according to the position of the vane 203 on the end of the stem 204, which is controlled by the handle 205. This valve may be of any ordinary construction, that shown sufficing as an example. It will be noted that the vane 203 is so constructed that when air is being admitted into either pipe 105 or 110, exhaust is permitted through the open port 217 at the bottom of the valve from the other pipe.

The handle 205, which operates the valve A, is extended down below the stem 204, as indicated by 219. This extension 219 is provided with two diverging downwardly extending arms 221, each provided with a roller 222 at its end. When the lever 205 is in its upright position, with the valve A at neutral, the rollers 222 rest on the horizontal arm 223, pivoted at one end at 224. The arm 223 rests on the upper end of a rod 225, which controls the valve A'. It will be noted, that by this construction, movement of the lever 205 in either direction will cause depression of the arm 223 and consequent depression of the rod 225

I will now describe more in detail the construction and operation of the valve A', showing the function of the movement of the rod 225. It will be noted that air enters the valve A' through the pipe 201, and leaves through the pipe 200, the direction of travel being indicated by the arrows in Fig. 14. The valve A' is designed to supply a constant discharge pressure in the pipe 200, regardless of the supply pressure in the pipe 201; the actual pressure supplied being dependent upon the extent of depression of the rod or stem 225. The operation and construction of this valve is as follows. Pressure on the pipe 200 acts through the port 230 on the piston 231. Upward movement of the piston 231 is resisted by the spiral spring 232, the upper end of which bears against the disk 233 on the bottom of the rod 225. This construction permits the piston 231 to be raised by an increase of the reduced pressure in the pipe 200 and forced down by the spring 232, when the reduced pressure is decreased. The auxiliary valve 234 is held in contact with the piston 231 by the auxiliary spring 236, and moves up and down freely with the piston. As soon as the valve 234 opens, air passes through into port 238 and under piston 239. By raising the piston 239, main valve 240 opens against the initial pressure, because the area of valve 240 is only one-half that of piston 239. Air is thus admitted into pipe 200. When the pressure in the pipe 200 reaches the required point, which is determined by the spring 232, the piston 231 is forced upwardly by the reduced pressure, which passes up through the port 230 to the chamber 250 under the piston 231, allowing the valve 234 to close, and shutting off air from the piston 239. When this occurs, main valve 240 seats by initial pressure, thus shutting off air from the pipe 200 and pushing the piston 239 downwardly. Air below the piston 239 exhausts freely around the piston (which is fitted loosely for this purpose) and passes off into the pipe 200. The piston 239 is fitted with a plunger 260, operating in a dashpot 261 to prevent chattering and pounding. It will be seen, that by this construction, the pressure maintained in the pipe 200 is determined by the degree of depression of the spring 232, which in turn is governed by downward movement of the rod 225. The further down the rod 225 is held, the greater will be the pressure maintained in the pipe 200. When the rod 225 is held in one position, the main valve 240 will assume a position which will furnish just enough air to maintain the corresponding pressure in the pipe 200.

The parts are so adjusted, proportioned and arranged, that movement of the arm 205 first turns the four-way valve A so that air will be admitted either to the pipe 105 or 110. Further movement of the arm 205 then operates to depress the rod 225 of the valve A', so that this valve will deliver the desired pressure into either pipe 105 or 110, whichever is open. Because of the operation of the valve A', such pressure delivered will remain constant as long as the lever 205 is held in one position. This pressure, however, may be changed if desired by movement of the lever 205. In operation, therefore, if it is desired, for example, to tighten the clutch band 70 and hold the same at a desired tension, the lever 205 is moved away from the observer (as viewed in Fig. 8) thus turning the four-way valve A to admit air into the pipe 110. This movement being continued a short distance, depresses the rod 225 of the valve A', so that this valve will deliver a constant pressure through the pipe 200. This pressure will remain constant as long as the lever 205 is held in one position. This constant pressure will, therefore, maintain a constant pressure on the clutch band, regardless of any air leakage or consumption in the clutch operation mechanism. If it is desired to increase the tension, all that is necessary is to move the lever 205 further, which will depress the rod 225 more, thus causing the pressure delivered by the valve A' to be increased.

Although I have shown the valve A' as operating in conjunction only with the valve A; it is obvious that each of the other valves B, C and D could be equipped with a valve similar to valve A', so that the clutches controlled by these valves could be operated in the same manner that the clutches are operated by the valves A and A'.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In combination, two devices adapted to be operated by fluid under pressure, means for supplying fluid under pressure, means for conducting the fluid from the supply means to the devices adapted to be operated thereby, a four-way valve interposed between the supply means and the devices adapted to be operated, said four-way valve adapted to direct the fluid under pressure to either one or the other of said devices, and a reducing valve interposed between the fluid supply means and the four-way valve, including a quickly movable lever for supplying said fluid to the four-way valve at pressures quickly variable solely with the setting of the lever.

2. In combination two devices adapted to be operated by fluid under pressure, means for supplying fluid under pressure, means for conducting the fluid from the supply means to the devices adapted to be operated thereby, a four-way valve interposed between the supply means and the devices adapted to be operated, said four-way valve adapted to direct the fluid under pressure to either one or the other of said devices, and a reducing valve interposed between the fluid supply means and the four-way valve, including a quickly movable hand lever for supplying said fluid to the four-way valve at pressures quickly variable solely with the setting of the hand lever.

3. In combination, two devices adapted to be operated by fluid under pressure, means for supplying fluid under pressure, means for conducting the fluid from the supply means to the devices adapted to be operated thereby, a four-way valve interposed between the supply means and the devices adapted to be operated, said four-way valve adapted to direct the fluid under pressure to either one or the other of said devices, and adjustable means interposed between the fluid supply means and the four-way valve for supplying said fluid to the four-way valve at pressures quickly variable solely with the adjustment thereof.

4. In combination two devices adapted to operate by fluid under pressure, means for supplying fluid under pressure, means for conducting the fluid from the supply means to the devices adapted to be operated by said fluid, a four-way valve interposed between the fluid supply means and the devices adapted to be operated, said four-way valve adapted to deliver fluid under pressure to either one or the other of said devices, a reducing valve interposed between the fluid supply means and the four-way valve and means for simultaneously operating the four-way valve and the reducing valve.

5. In combination two devices adapted to operate by fluid under pressure, means for supplying fluid under pressure, means for conducting the fluid from the supply means to the devices adapted to be operated by said fluid, a four-way valve interposed between the fluid supply means and the devices adapted to be operated, said four-way valve adapted to deliver fluid under pressure to either one or the other of said devices, a reducing valve interposed between the fluid supply means and the four-way valve and a single lever adapted to operate both the four-way valve and the reducing valve.

6. In combination two devices adapted to operate by fluid under pressure, means for supplying fluid under pressure, means for conducting the fluid from the supply means to the devices adapted to be operated by said fluid, a four-way valve interposed between the fluid supply means and the devices adapted to be operated, said four-way valve adapted to deliver fluid under pressure to either one or the other of said devices, a reducing valve interposed between the fluid supply means and the four-way valve and a single lever adapted to operate by movement in either direction from its neutral position, first the four-way valve and then the reducing valve.

Witness my hand and seal this 13 day of January, 1922.

JOHN W. PAGE.